United States Patent [19]
Ueda

[11] Patent Number: 5,499,310
[45] Date of Patent: Mar. 12, 1996

[54] OPTICAL FIBER CONNECTOR WITH SLEEVE FOR RESILIENTLY FITTING AN OPTICAL FIBER THERETO

[75] Inventor: Tetsuji Ueda, Tokyo, Japan

[73] Assignee: NEC Corporation, Japan

[21] Appl. No.: 250,556

[22] Filed: May 27, 1994

[30] Foreign Application Priority Data

May 28, 1993 [JP] Japan .................................. 5-126807

[51] Int. Cl.⁶ ................................................... G02B 6/36
[52] U.S. Cl. .................................... 385/84; 385/86
[58] Field of Search ................................. 385/78–84, 69, 385/86, 87

[56] References Cited

U.S. PATENT DOCUMENTS

| | | | |
|---|---|---|---|
| 4,730,892 | 3/1988 | Anderson et al. | 385/69 X |
| 4,781,431 | 11/1988 | Wesson et al. | 385/78 X |
| 5,018,821 | 5/1991 | Kurata | 385/72 |

FOREIGN PATENT DOCUMENTS

| | | | |
|---|---|---|---|
| 374939 | 6/1990 | European Pat. Off. . | |
| 517346 | 12/1992 | European Pat. Off. . | |
| 61-138213 | 6/1986 | Japan | 385/84 |
| 63-8613 | 1/1988 | Japan . | |
| 87/07035 | 11/1987 | WIPO . | |

OTHER PUBLICATIONS

"A New Quick Field Installable Single Mode Optical Fiber Connector", by Kazuhiko Kurata et al., NEC Res. & Develop., vol. 32, No. 1, Jan. 1991, pp. 61–68.

K. Kurata, et al., "A New Quick Field Installable Single Mode Optical Fiber Connector", NEC Research & Development 32 (1991) Jan., No. 1, pp. 61–68, Tokyo, Japan.

Patent Abstracts of Japan, vol. 9, No. 167 (P-372) 12 Jul. 1985, JP A 60 042 718.

Patent Abstracts of Japan, vol. 7, No. 274 (P-241) 7 Dec. 1983, JP A 58 152 215, 9 Sep. 1983.

Primary Examiner—John D. Lee
Attorney, Agent, or Firm—Ostrolenk, Faber, Gerb & Soffen

[57] ABSTRACT

The ferrule of a simplified field assembly optical fiber connector in which adhesive material is unnecessary for assembling. The sleeve body, enclosing the rear, end portion of the capillary, is provided with a window-like and rectangular-shaped opening about its middle point. Both side surfaces of the remaining portion of the sleeve body at the window section are dented with respect to the other portion of the sleeve body. The inlaid part is made of resilient material and has the opened-rectangular-shaped inner surface, such that it can be inlaid in the outer surface of the dented portion of the sleeve body, in other words, the window section. Along the central axis of the inner surface, the inlaid part is provided with the groove throughout the whole length, such that it can press the optical fiber with jacket against the groove, when the inlaid part is fitted in the window section.

9 Claims, 9 Drawing Sheets

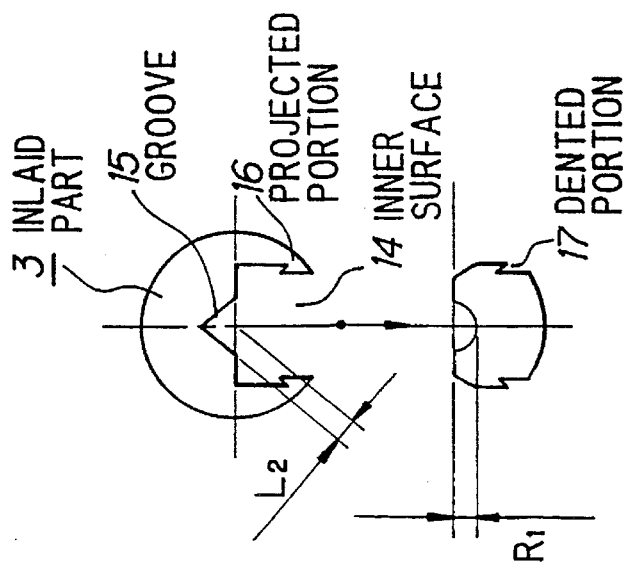
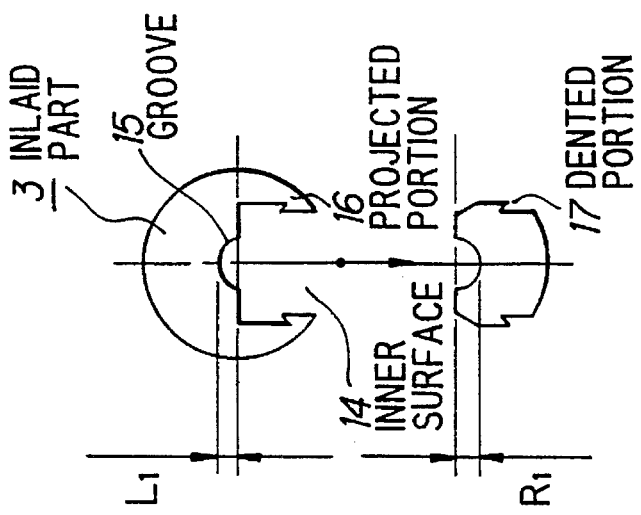
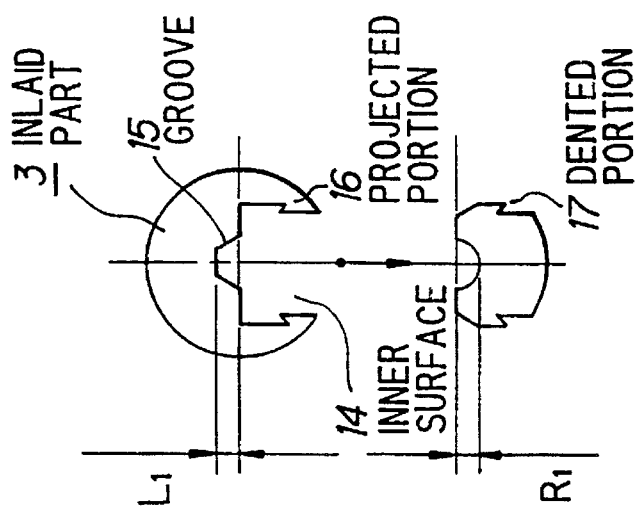

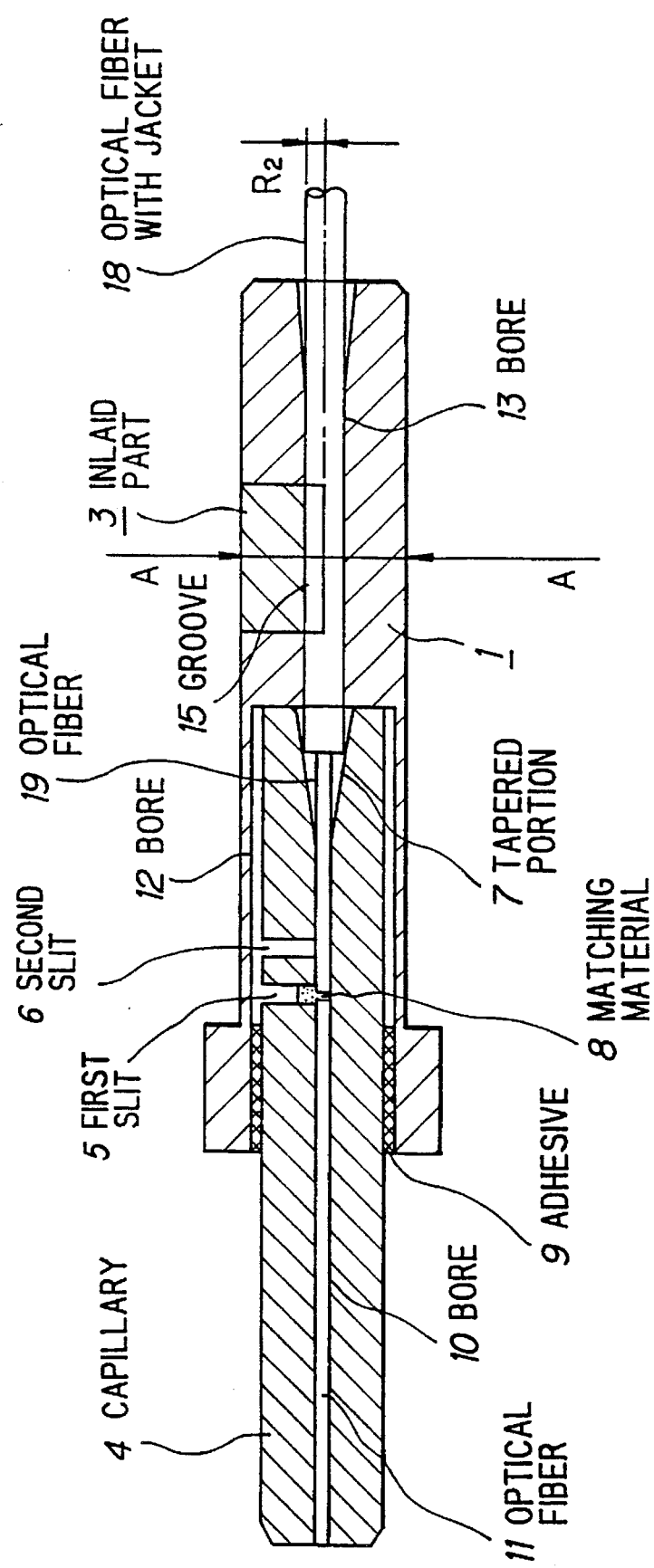

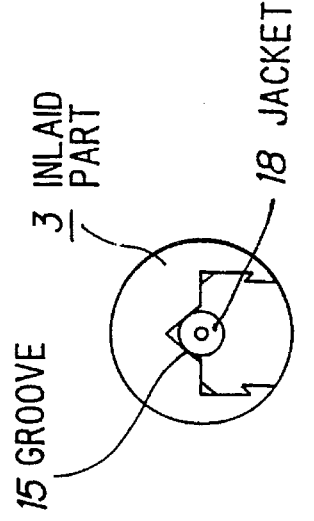
FIG.6A TRAPEZOIDAL
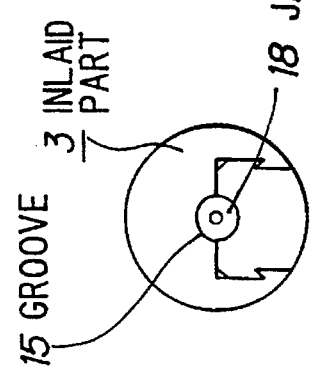
FIG.6B HALVED-ELLIPTICAL
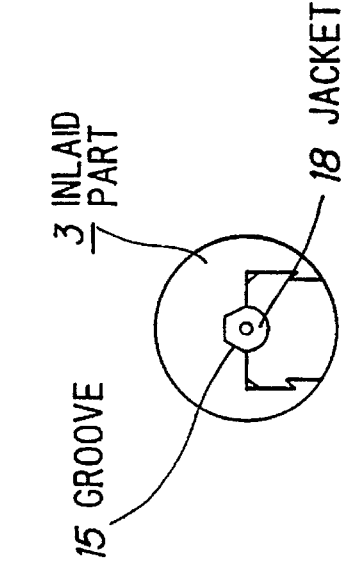
FIG.6C V-SHAPED

OPTICAL FIBER CONNECTOR WITH SLEEVE FOR RESILIENTLY FITTING AN OPTICAL FIBER THERETO

FIELD OF THE INVENTION

This invention relates to an optical fiber connector, and more particularly, to a mechanically assembled structure of a ferrule of optical fiber connectors.

BACKGROUND OF THE INVENTION

It is very important to assemble optical fiber connectors easily and quickly in the field of installations of optical cables for wide-spread optical communication. As an example of a conventional technology, we can quote the invention appearing in Japanese Patent Laid-Open No. 63-8613.

In that invention, a short-length optical fiber is fixed in a ferrule, and the end surface of the ferrule is polished, previously in the manufacture. An optical fiber to be spliced is mechanically spliced to the one in the ferrule, and then assembling can be easily completed. In the simplified, field-assembly optical connector, polishing is unnecessary in the terminating procedure, and assembling of an optical fiber can be completed easily within a short time, even in a narrow space into which carrying a polishing machine is difficult.

On the above-mentioned ferrule for the optical fiber connector, however, the following disadvantages have been pointed out. For high and stable performance of the optical fiber connector, the optical fiber to be spliced is fixed to the inner surface of the ferrule, and light-curing adhesive is used for this purpose. It is troublesome to handle the adhesive material, and a high-power light source becomes necessary at the spot of work for hardening the adhesive.

SUMMARY OF THE INVENTION

Accordingly, the present invention provides a ferrule of an optical fiber connector with which assembling the optical connection is completed within a short time by making the adhesive material unnecessary.

According to the invention, the connector comprises:

a ferrule of an optical fiber connector consisting of a capillary, which has a first straight bore containing a previously-incorporated, short-length optical fiber, extending from a leading end of the capillary to its nearly halfway point, and being supplied with optical matching material at its rear end; and a sleeve body, which is mechanically combined with the capillary around a common central axis and has a second bore guiding an optical fiber with a jacket to be spliced such that its leading end butts against a rear end of the incorporate optical fiber; wherein, the sleeve body has a third bore with an enlarged diameter near its leading end, and encloses a rear end portion of the capillary, and has a rectangular window-like opening located at about a middle point between a rear end of the capillary and that of the sleeve body, which is cut in a radial direction from an outer surface of the sleeve body to a central axis, and both side surfaces of remaining portions of which are dented at the window section with respect to those of other portions, and has at least one more deeply dented portion on each side surface running in parallel with the central axis, and has an inlaid part which is made of resilient material and has an opened-rectangular inner surface with complementary unevenness of those of the side surfaces of the sleeve body, and has a groove along the central axis, and bottom surface of which has at least one vertical distance from the center axis being slightly smaller than the radius of the optical fiber with jacket.

BRIEF DESCRIPTION OF THE DRAWINGS

This invention will be explained in more detail in conjunction with appended drawings, wherein:

FIGS. 2A to 2C show state of injection of adhesive, insertion of optical fiber, and illumination of light, respectively, FIGS. 4A to 4C are cross-sectional views of FIG. 3 in A—A cross-section, FIG. 5 is a cross-sectional view of the first embodiment of the present invention when splicing of optical fibers is completed, FIGS. 6A to 6C are cross-sectional views of FIG. 3 in A—A cross-section, where (a), (b) and (c) show cases in which shape of groove is trapezoidal, elliptical, and V-shaped, respectively.

DETAILED DESCRIPTION OF THE DRAWINGS

Before explaining the structure of the ferrule of the optical fiber connector according to the present invention, the aforementioned conventional ferrule of the optical fiber connector will be explained referring to FIGS. 1 and 2.

Figure 1:
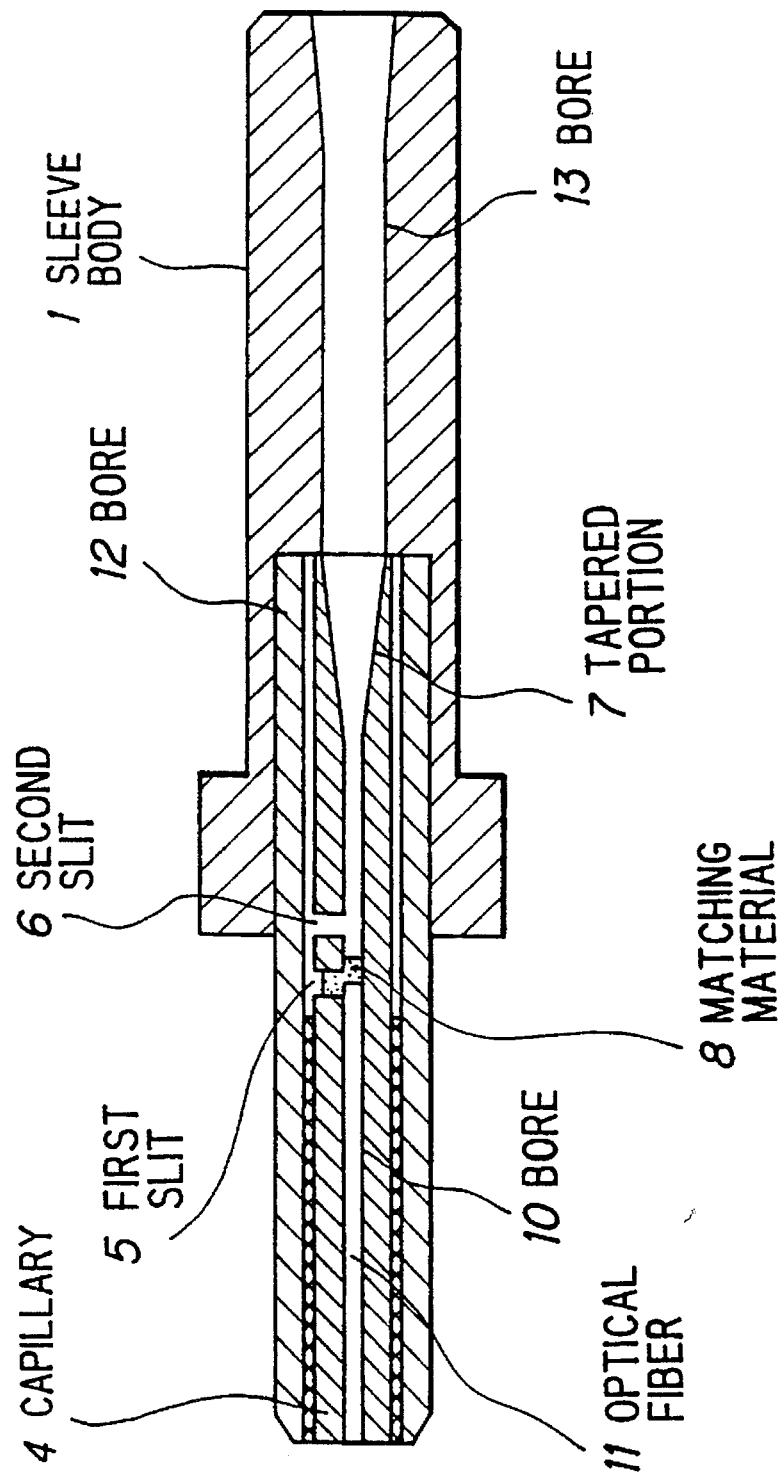
FIG. 1 is a cross-sectional view of the structure of a conventional ferrule of a simplified, field-assembly optical fiber connector.
Figure 2A:
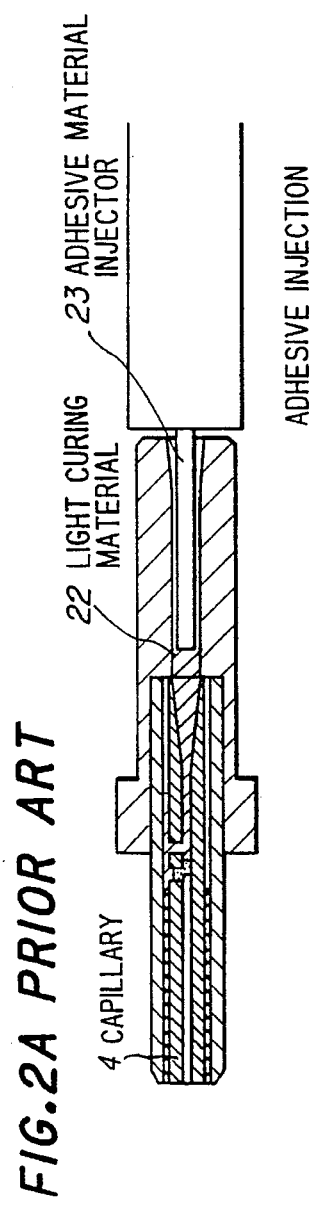
FIGS. 2A to 2C are cross-sectional views showing a procedure for assembling the conventional ferrule for the simplified, field-assembly optical fiber connector, where
Figure 2B:
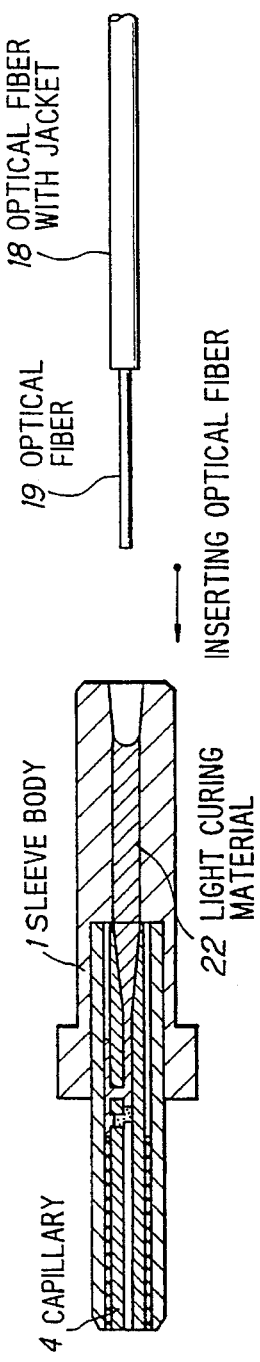

FIGS. 1 and 2 show a structure of a ferrule of a conventional, simplified field-assembly, optical fiber connector and its assembling procedure, respectively. In a ferrule of a conventional, simplified field-assembly, optical fiber connector, when connected to an optical fiber fixed in a capillary 4, firstly, light-curing adhesive 22 is filled in a ferrule 1 by an adhesive injector 23 as shown in FIG. 2A, secondly, an optical fiber with jacket 18 and an optical fiber 19, which have been processed in the prescribed way, are inserted into the ferrule as shown in FIG. 2B, and thereafter light-curing adhesive 22 is hardened by UV or visible rays from a light source 24, thereby the optical fiber with jacket 18 and the optical fiber 19 are fixed within the ferrule.

Figure 2C:
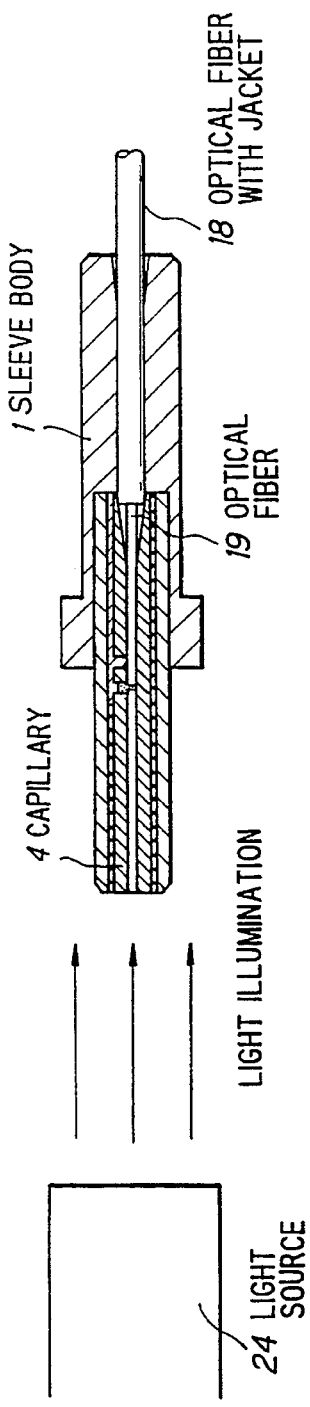

Moreover, optical matching material 8 as shown in FIG. 1 and, first and second slits, 5 and 6, as shown in FIG. 2C, are the same as those used in this invention, and will be explained in description of embodiment of this invention.

In the aforementioned, simplified field-assembly, optical fiber connector, light-curing adhesive 22 is used to fix an optical fiber, and therefore an adhesive injector and a light source are necessary. Special attention must be paid to handling the light-curing material, that is to say, in using, to controlling the volume of injected material and ventilation of the air in the spot of work, and in storing, to the method of storage such as light shielding and ambient temperature. Since the adhesive material has its own pot life, its usable period is limited. Since the light source 24 is necessary for hardening, this equipment must be carried into the spot of work. In using the light source in the spot where the AC electric source is not available, the battery source must be used, thereby the time of work is limited.

Next, the first preferred embodiment of the structure of the ferrule of the optical fiber connector will be explained referring to FIGS. 3 to 6.

Figure 3:
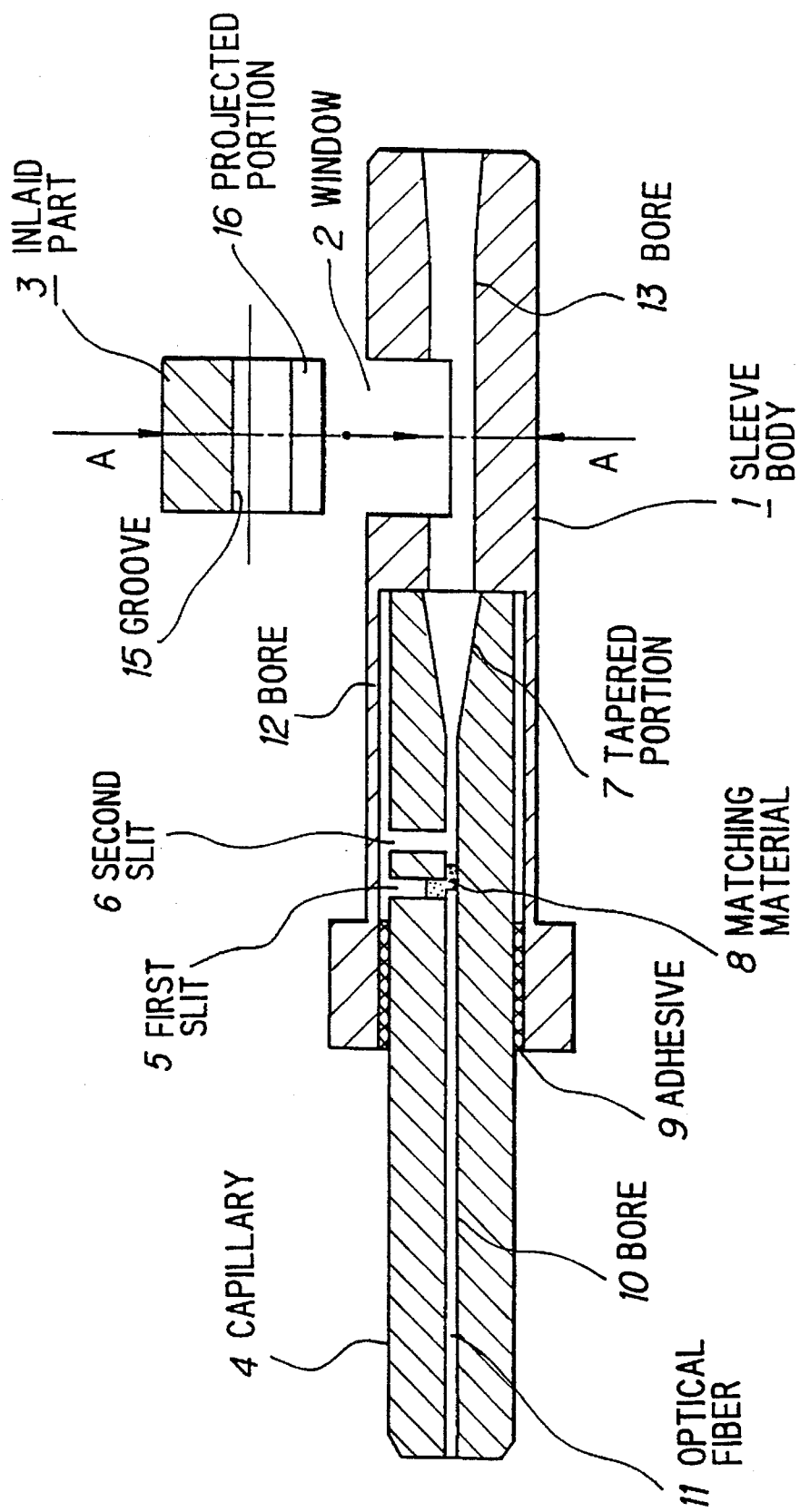
FIG. 3 is a cross-sectional view showing the first preferred embodiment of the present invention.

As shown in FIG. 3, the ferrule of the optical fiber connector of the present invention consists of the capillary 4 shaped into a circular cylinder, the sleeve body 1, which encloses the rear end of the capillary 4 and is provided with a slit-like window section 2 at its approximately-intermediate portion, and an inlaid part 3 which can be inlaid in the window section 2.

The capillary 4 has a cylindrical outer surface and a bore 10 with an inner diameter being slightly larger than the outer diameter of an optical fiber 11. The capillary 4 is provided with the first slit 5 and the second one 6, which are perpendicular to the central axis of the bore 10 and connect with the exterior of the capillary with the above-mentioned bore. Moreover, the aforementioned bore 10 has a tapered portion 7 for inserting an optical fiber in the vicinity of the rear end of the capillary 4. In the first slit 5, the optical matching material 8 is detained, and the second slit 2 is a way of allowing escape of the air. In the bore 10 of the capillary 4, a short optical fiber 11, which is incorporated previously during manufacture, extends from the leading end of the capillary 4 to the first slit 5, and is fixed by adhesive material. The rear end surface of the short optical fiber 11 has been polished into a mirror surface, or has been mirror-cut previously. The leading end surfaces of said fiber 11 and the sleeve 4 are aligned to be coplanar and can be polished into mirror surfaces simultaneously. The rear end of the capillary 4 is fixed by adhesive material 9 to the inner surface of the large sleeve 12, which has an enlarged inner diameter and is positioned in the leading end of the sleeve body 1.

The rear end portion of a circular sleeve body 1 has the bore 13 with an intermediate inner diameter being slightly larger than the outer diameter of the optical fiber jacket, and is provided with the window 2 which is located at about the middle point between the rear end of the sleeve and the capillary 4. The window is cut in the radial direction from the outer surface of the sleeve body 1 to its central axis. Moreover, the remaining part of the window section of the sleeve body 1 has both side surfaces which are dented with regard to the other portions of the sleeve body 1, as shown in FIGS. 4A–4C.

The inlaid part 3 is inlaid in the dented portion of the window section 2 on the sleeve body 1, and is made of resilient material, such that it can be fixed tightly by elastic deformation. As shown in FIG. 4A, the inlaid part 3 has the opened-rectangular shaped inner surface 14, when viewed in its cross-section, such that it can be fitted in the window section 2 on the sleeve body 1. Moreover, the inner surface 14 has the projected portion 16, and the dented portion at the window section 2 on the sleeve body 1 has the dented portions 17, where the projected portion 16 and the dented portion 17, run in parallel with the longitudinal axis, and can be inlaid in and fixed to each other. FIG. 5 shows the situation when this process is completed, and FIGS. 6A to 6C show the fitting of the inlaid part 3 into the window section 2.

As shown in FIG. 5, the inlaid part 3 is provided with a groove 15 along the central axis of the inner surface 14, such that the optical fiber with jacket 18 can be enclosed in the groove 15, when inlaid part 3 is inlaid in the window section 2 on the sleeve body 1. As shown in FIG. 4A, the cross-sectional view in A—A cross-section, $L_1$, the depth of the groove 15 is slightly smaller than $R_2$, the radius of the optical fiber with jacket 18, such that the groove 15 of the inlaid part 3 can press the outer surface of the optical fiber with jacket 18 and fix it, when the inlaid part 3 is inlaid in the window section 2. FIG. 4A shows the case where the shape of the groove 15 in the cross-section is trapezoidal, however, FIGS. 4B and 4C show the case where the shape of the groove 15 is halved-elliptical and V-shaped respectively, as examples of other embodiments. In the case of FIG. 4C, the depth of the V-shaped groove 15 is larger than the outer diameter $R_2$ of the fiber with jacket 18, however, $L_2$, the orthogonal distance from the central axis to the V-shaped surface, is slightly smaller than $R_2$.

Due to the aforementioned structure, in the ferrule of the optical fiber connector according to the present invention, as shown in FIGS. 6A–6C, the outer surface of the optical fiber with jacket 18 can be pressed against the inner surface of the groove 15 and fixed by fitting the inlaid part 3 in the window section 2, after inserting the optical fiber with jacket 18 and the optical fiber 19 into the circular bore 13 with the intermediate diameter.

Figure 7:
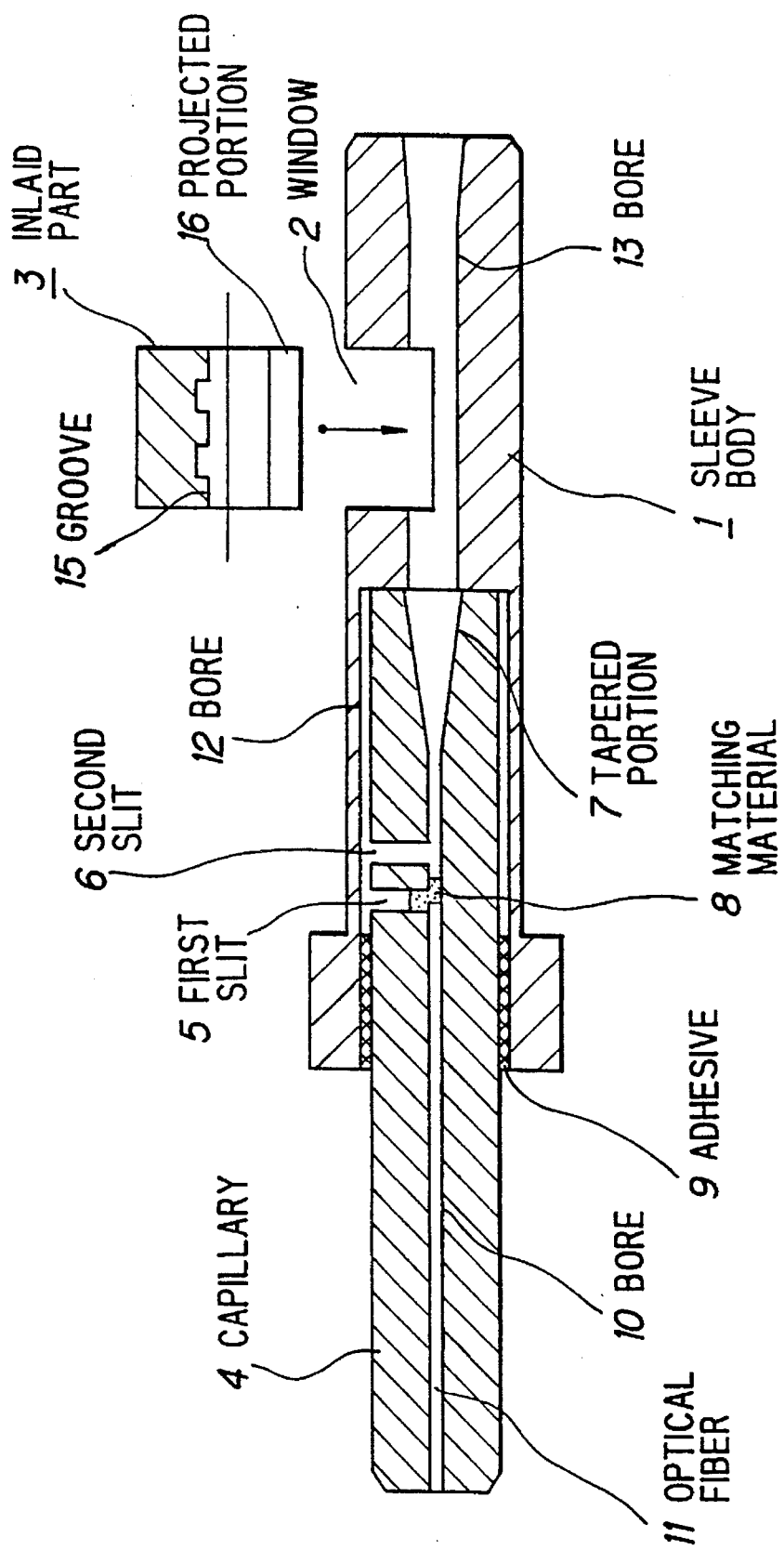
FIG. 7 is a cross-sectional view of the second embodiment of the present invention.

To fix the optical fiber with jacket 18 more tightly, the inner surface of the groove 15 may have square-wave formed unevenness as shown in the second embodiment in FIG. 7.

The procedure of assembling the ferrule in the field of the cable installation is as follows. After being processed and cut in the prescribed way, the optical fiber to be spliced is inserted into the bore 13 with an intermediate diameter, until it butts against the end surface of the short optical fiber 11, which has been incorporated in the capillary 4, at the first slit 5, and thereafter the inlaid part 3 is inlaid in the window section 2. As stated above, in the ferrule structure according to the present invention, the optical fiber with jacket 18 can be fixed by the inlaid part 3 such that the optical fiber 19 butts against the short optical fiber 11, and therefore light-curing adhesive is unnecessary. Moreover, since the optical matching material 8 is detained at the first slit 5, the spliced point of the optical fibers can be made to have stable optical characteristic.

Figure 8:
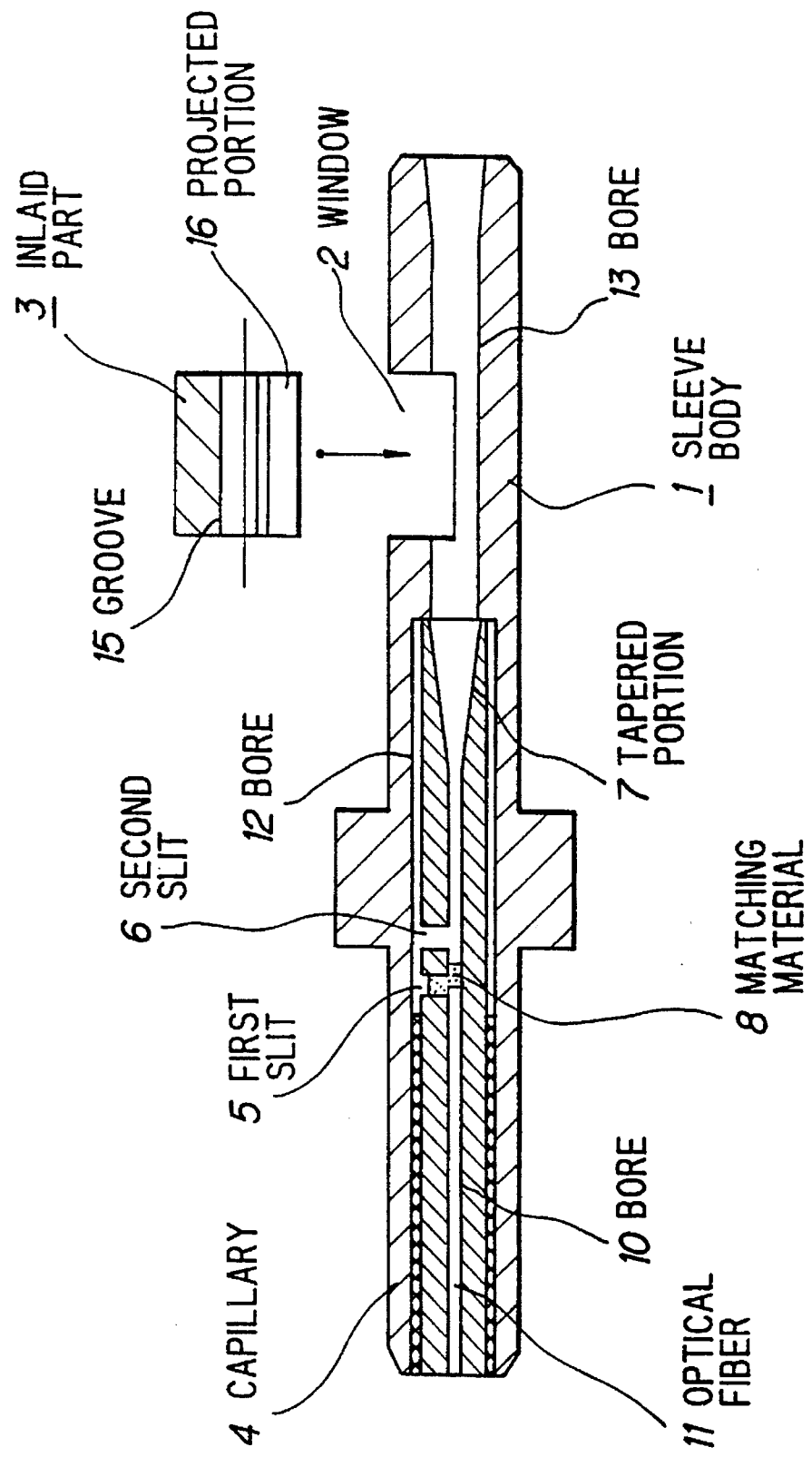
FIG. 8 is a cross-sectional view of the third embodiment of the present invention.
Figure 9:
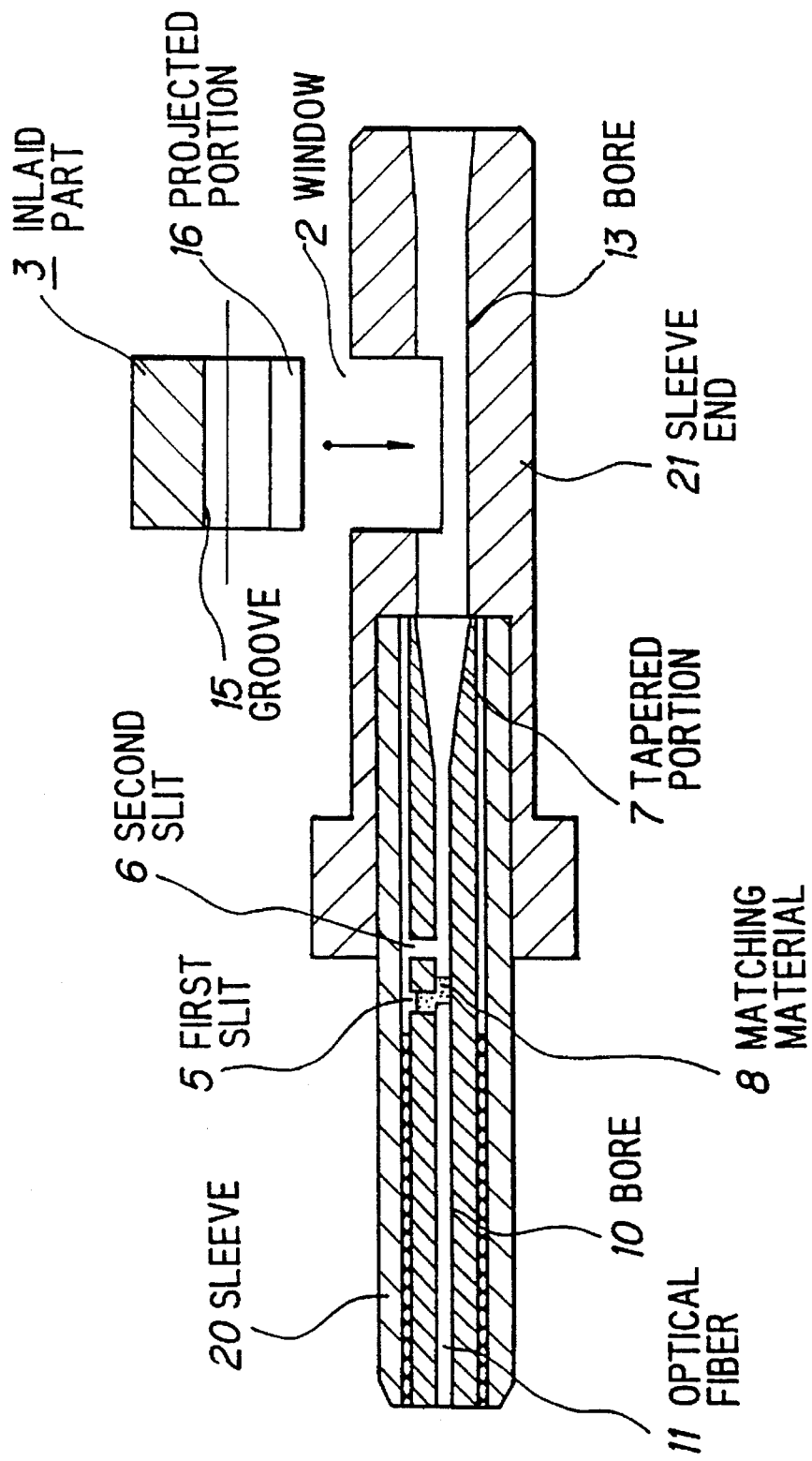
FIG. 9 is a cross-sectional view of the fourth embodiment of the present invention.

FIGS. 8 and 9 are the cross-sectional views which show the third and fourth embodiments of the present invention respectively.

The ferrule of the optical fiber shown in FIG. 8 is the third embodiment of the present invention in which the sleeve body 1 covers all of the outer surface of the capillary 4. In the structure shown as the fourth embodiment in FIG. 9, the sleeve 1 consists of two parts; a sleeve 20 which covers perfectly the outer surface of the capillary 4, and the sleeve end 21 which encloses and fixes the rear end portion of the sleeve 20.

The capillary 4 is made of glass, ceramics, plastics and others. The sleeve body 3 is made of metals, such as stainless steel or phosphor-bronze, or plastics. The inlaid part 3 is made of resilient material, for example plastics or elastic metals.

All of the aforementioned structures are preferred embodiments for explaining the present invention intelligibly, and should not be used to restrict the limit of the appended claims.

As described before, the advantage of the ferrule of the optical fiber according to the present invention is that the optical fiber with jacket can be fixed tightly by the mechanical force due to elastic deformation of the inlaid part, the adhesive material becomes unnecessary, and the termination of the optical fiber can be completed within a short time, because the inlaying method is introduced into the conventional, simplified field-assembly, optical connector.

The further advantage of the present invention is that the termination of the optical fiber can be performed even in the narrow space into which carrying the light source is difficult, and limitation on the spot of work is largely reduced, because the light source becomes unnecessary.

The structure of the ferrule of the optical fiber connector according to the present invention furnishes the simplified, quick, field-assembly termination in the field of cable installations, which contributes evidently to the spread of the optical communication.

Although the invention has been described with respect to specific embodiments for complete and clear disclosure, the appended claims are not to be thus limited but are to be construed as embodying all modifications and alternative constructions that may occur to one skilled in the art which fairly fall within the basic teaching here set forth.

What is claimed is:

1. A ferrule of an optical fiber connector comprising
   a capillary having a leading end and a rear end, which has a first straight bore containing an optical fiber, said optical fiber extending from said leading end toward said rear end of said capillary to nearly a capillary halfway point, said optical fiber being supplied with optical matching material at a rear end thereof within said bore, and
   a sleeve body, which is mechanically combined with said capillary, around a common central axis, and has a second bore for guiding an optical fiber with jacket to be spliced until its leading end butts against said rear end of said optical fiber,
   said sleeve body having a third bore with an enlarged diameter near leading end thereof, which third bore encloses said rear end portion of said capillary, said sleeve body having a rectangular, window-like opening located at about a middle point between said rear end of said capillary and a rear end of said sleeve body, which window-like opening is cut in a radial direction from an outer surface of said sleeve body to a central axis, and
   opposing side surfaces of remaining portions of said sleeve body which are dented at said window-like opening with respect to side surfaces of other portions of said sleeve body, said opposing side surfaces having at least one more deeply dented portion on each side surface, said at least one more deeply indented portion running in parallel with said central axis, and
   an inlaid part which is made of resilient material and has an opened-rectangular inner surface with complementary unevenness corresponding to said at least one more deeply indented portion of said side surfaces of said sleeve body, said inlaid part having a groove along said central axis, a bottom surface of which has at least one vertical distance from said center axis being slightly smaller than a radius of said optical fiber with jacket.

2. A ferrule of an optical fiber connector according to claim 1, wherein a cross-sectional view of said groove on said inlaid part is trapezoid-shaped, in which a bottom side of said trapezoid-shaped groove located at a groove bottom is a shorter side, and a depth of said groove is slightly shorter than a radius of said optical fiber with jacket, and length of a top side at an upper aperture of said groove is slightly longer than a diameter of said optical fiber with jacket.

3. A ferrule of an optical fiber connector according to claim 1, wherein a cross-sectional view of said groove on said inlaid part is a halved ellipsoid, and a depth of said groove is slightly shorter than a radius of said optical fiber with jacket, and a width of an aperture of said groove is slightly larger than a diameter of said optical fiber with jacket.

4. A ferrule of an optical fiber connector according to claim 1, wherein a cross-sectional view of said groove on said inlaid part is v-shaped, and a vertical distance from said central axis to said groove surface is slightly shorter than a radius of said optical fiber with jacket, such that outer surface of said optical fiber with jacket is pressed by said groove surfaces.

5. A ferrule of an optical fiber connector according to claim 1, wherein a longitudinal cross-section of said groove on said inlaid part has a substantially square-wave shape.

6. A ferrule of an optical fiber connector according to claim 1, wherein said inlaid part is made of plastics.

7. A ferrule of an optical fiber connector according to claim 1, wherein said inlaid part is made of resilient metals.

8. A ferrule of an optical fiber connector according to claim 1, wherein said sleeve body covers over all outer surface of said capillary.

9. A ferrule of an optical fiber connector, comprising:
   a first optical fiber having a leading end and a rear end;
   a capillary provided with an axial bore having a leading open end and a rear open end, said axial bore of said capillary containing said first optical fiber fixed therein, such that said leading end of said first optical fiber is positioned at said leading open end of said capillary, and said rear end of said first optical fiber is positioned inside said axial bore of said capillary with a predetermined distance to said rear open end of said axial bore;
   a second optical fiber covered with a jacket, said second optical fiber having a terminating end which is not covered with said jacket;
   a sleeve provided with an axial bore having a leading open end and a rear open end and a window for exposing said axial bore at a point between said leading and rear open ends, said sleeve being connected to provide a linear alignment between said leading open end of said sleeve and said rear open end of said capillary, such that said terminating end of said second optical fiber is inserted through said rear open end of said sleeve to butt against said rear end of said first optical fiber in said axial bore of said capillary; and
   a fixing member fitted resiliently into said window of said sleeve to press said jacket which covers said second optical fiber, whereby said second optical fiber is fixed in said axial bore of said sleeve to maintain an optical coupling realized of said first optical fiber and said terminating end of said second optical fiber.

* * * * *